United States Patent
Xiao et al.

(10) Patent No.: US 9,578,466 B2
(45) Date of Patent: Feb. 21, 2017

(54) METHOD FOR INDOOR LOCALIZATION USING NOMADIC ACCESS POINTS

(71) Applicant: Guangzhou HKUST Fok Ying Tung Research Institute, Guangzhou, Guangdong (CN)

(72) Inventors: Jiang Xiao, Guangzhou (CN); Youwen Yi, Guangzhou (CN); Lu Wang, Guangzhou (CN); Lionel M. Ni, Guangzhou (CN)

(73) Assignee: Guangzhou HKUST Fok Ying Tung Research Institute, Guangzhou (CN)

( * ) Notice: Subject to any disclaimer, the term of this patent is extended or adjusted under 35 U.S.C. 154(b) by 252 days.

(21) Appl. No.: 14/568,151

(22) Filed: Dec. 12, 2014

(65) Prior Publication Data

US 2016/0066158 A1 Mar. 3, 2016

(30) Foreign Application Priority Data

Sep. 3, 2014 (CN) .......................... 2014 1 0446975

(51) Int. Cl.
*H04W 4/04* (2009.01)
*H04W 4/02* (2009.01)

(52) U.S. Cl.
CPC ............... *H04W 4/04* (2013.01); *H04W 4/021* (2013.01)

(58) Field of Classification Search
CPC ...... H04L 5/0007; H04L 5/0023; H04L 5/006; H04L 1/0026; H04W 4/021; H04W 4/04; H04W 64/00
See application file for complete search history.

(56) References Cited

U.S. PATENT DOCUMENTS

| | | | |
|---|---|---|---|
| 2005/0085240 A1* | 4/2005 | Fitzgerald | H04W 64/00 455/456.1 |
| 2008/0069031 A1* | 3/2008 | Zhang | H04B 7/0617 370/328 |
| 2011/0158172 A1* | 6/2011 | Kande | H04L 41/0806 370/328 |
| 2013/0034007 A1* | 2/2013 | Zhang | H04W 72/0446 370/252 |
| 2014/0064126 A1* | 3/2014 | Lim | H04W 24/00 370/252 |
| 2015/0234033 A1* | 8/2015 | Jamieson | G01S 5/04 455/456.1 |
| 2016/0018507 A1* | 1/2016 | Chen | G01S 5/0252 455/456.2 |

* cited by examiner

Primary Examiner — Matthew Sams

(57) ABSTRACT

A method for indoor localization using nomadic access points, comprising the following steps: a target object transmits a modulated signal over wireless channels to nearby access points, wherein the access points include both static access points and nomadic access points; the access points measure channel state information via the signal from the target object, after that, the static access points export the channel state information to a server, the nomadic wireless access point report the channel state information along with their coordinates of the current sites to the server; and based on the channel state information, the server determines the target object's relative proximity to two arbitrary access points, then based on the result of the relative proximity determination and the coordinates, the server estimates a feasible region for the target object with a space partition-based algorithm.

8 Claims, 3 Drawing Sheets

METHOD FOR INDOOR LOCALIZATION USING NOMADIC ACCESS POINTS

CROSS-REFERENCE TO RELATED APPLICATIONS

This present application claims the benefit of Chinese Patent Application No. 201410446975.7 filed on Sep. 3, 2014, the contents of which are hereby incorporated by reference.

FIELD OF THE INVENTION

The present invention relates to positioning techniques, especially to a method for indoor localization using nomadic access points.

BACKGROUND OF THE INVENTION

Modern indoor location-based services (ILBS) have rapidly expanded into people's daily life. Predicted by Market and Markets, indoor location market will worth 2.6 Billion U.S. dollars by 2018. To meet the breath of the golden opportunity, several major cooperations have initiated their researches on indoor localization, such as Apple, Google, Microsoft, Nokia, etc. The competition mainly focuses on the location accuracy and user experience.

With the proliferation of wireless communication and mobile computing, WLAN advances indoor localization with its prevalent infrastructure and low cost, as compared with multiple short range communication technologies like infrared, ultrasonic, RFID, and Zigbee sensors. So nowadays, WLAN has become one of the most popular positioning techniques. In WLAN, positioning systems consist of several fixed access points (APs) and an object with a WiFi-enabled device (e.g., wireless router, laptop or smartphone). The fixed AP, also known as static AP, is an infrastructure having a fixed location and a fixed working frequency. The nomadic AP is a WiFi-enabled device having a mobile location. The mainstream principle of WLAN-based positioning system is to leverage propagation models or location fingerprints with the topology of the fixed APs to estimate the target object's location.

However, the above-described WLAN-based indoor positioning systems still suffer from a serious problem named "spatial localizability variance". That is, while the overall performance of the positioning system is stable, the localization accuracy at certain places is in low resolution. As a result, it brings in user experience inconsistency and leads to a poor user experience. One typical example can be found in location-based advertising in a large marketplace. Normally, an appropriate advertisement for a specific customer is chosen based on the statistics of the customer's current location and his history data. However, if the location accuracy is in low resolution, the statistic data can be misleading and may thus lead to inappropriate advertising. The reason for "spatial localizability variance" is the fixed APs are not dedicated for localization functionality. In addition, the dynamic change of the indoor environment, such as the movement of people and the movement of equipments, can affect the localization. Therefore, finding a way to optimize the topology of fixed APs to reduce the effects caused by dynamic deployment of fixed APs will be very helpful to indoor localization.

Existing WLAN-based positioning methods can be classified into two categories, i.e. propagation model-based method and fingerprint-based method. The propagation model-based methods calculate the distance between the transmitter and the receiver, estimate the object's location by trilateration or multilateration. The fingerprint-based methods use wireless devices to collect signals from reference positions as fingerprints, pre-process the fingerprint and save them to a database, in this way, by matching the received signal with the data in database, the object's location can be determined. However, since the propagation-based methods need calibration to obtain the environment parameters, the fingerprint-based methods cannot establish the location fingerprint database due to the mobility of nomadic APs, both of these two methods are not fit for solving the problem of spatial localizability variance.

SUMMARY OF THE INVENTION

The object of the present invention is to provide a method for indoor localization using nomadic APs that can optimize indoor localization, improve the positioning accuracy and mitigate the performance degradation due to multipath and none-line-of-sight (NLOS) effects.

In order to solve the above-mentioned problem, the embodiment of the present invention provide a method for indoor localization using nomadic APs, which comprises the following steps:

a target object transmits a modulated signal over wireless channels to nearby APs, wherein the APs comprise both static APs and nomadic APs;

the APs measure channel state information (CSI) via the signal from the target object, after that, the static APs export the CSI to a server, the nomadic APs report the CSI along with current coordinates of the nomadic APs to the server; and based on the CSI, the server determines the target object's relative proximity to two arbitrary APs, then based on a result of the relative proximity determination and the coordinates of both the static APs and the nomadic APs, the server estimates a feasible region for the target object by using a space partition-based algorithm.

Furthermore, after the step that the server estimates the feasible region for the target object by using the space partition-based algorithm, the method comprises the following steps:

the nomadic APs move to another position and let the target object transmit another modulated signal, the server then obtains new CSI and new coordinates;

based on the new CSI, the server determines the target object's relative proximity to two arbitrary APs again, then based on a new result of the relative proximity determination and the new coordinates, the server further narrows down the feasible region by using the space partition-based algorithm.

Furthermore, after the step that the server further narrows down the feasible region by using the space partition-based algorithm based on the new result of the relative proximity determination and new coordinates, the method comprises the following step:

based on an area boundary restriction, the server further narrows down the feasible region.

Furthermore, after the step that the server further narrows down the feasible region based on the area boundary restriction, the method comprises the following step:

choose a center point of the feasible region as an approximation result for localization.

The embodiments of the present invention provide a calibration-free indoor localization method leveraging nomadic APs to improve the localization accuracy. The embodiments of the present invention realize the indoor localization by leveraging the mobility of nomadic APs, dynamically adjusting the WLAN network topology, collecting the PHY layer CSI in the frequency domain, transforming the frequency domain CSI into time domain channel impulse response (CIR), calculating the power of direct path (PDP), eliminating both the multipath and NLOS effects, and choosing the PDP as an indicator for proximity determination. The methods provided by the embodiments of the present invention are calibration-free, low-cost and accurate.

BRIEF DESCRIPTION OF THE DRAWINGS

To describe the technical solutions in the embodiments of the present invention more clearly, the following briefly introduces the accompanying drawings needed for describing the embodiments or the prior art. Apparently, the accompanying drawings in the following description only show some of embodiments of the present invention. Persons of ordinary skill in the art may still derive other drawings from these accompanying drawings without creative efforts.

DETAILED DESCRIPTION OF ILLUSTRATED EMBODIMENTS

The technical solutions in the embodiments of the present invention are clearly and completely described in the following with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

Figure 1:
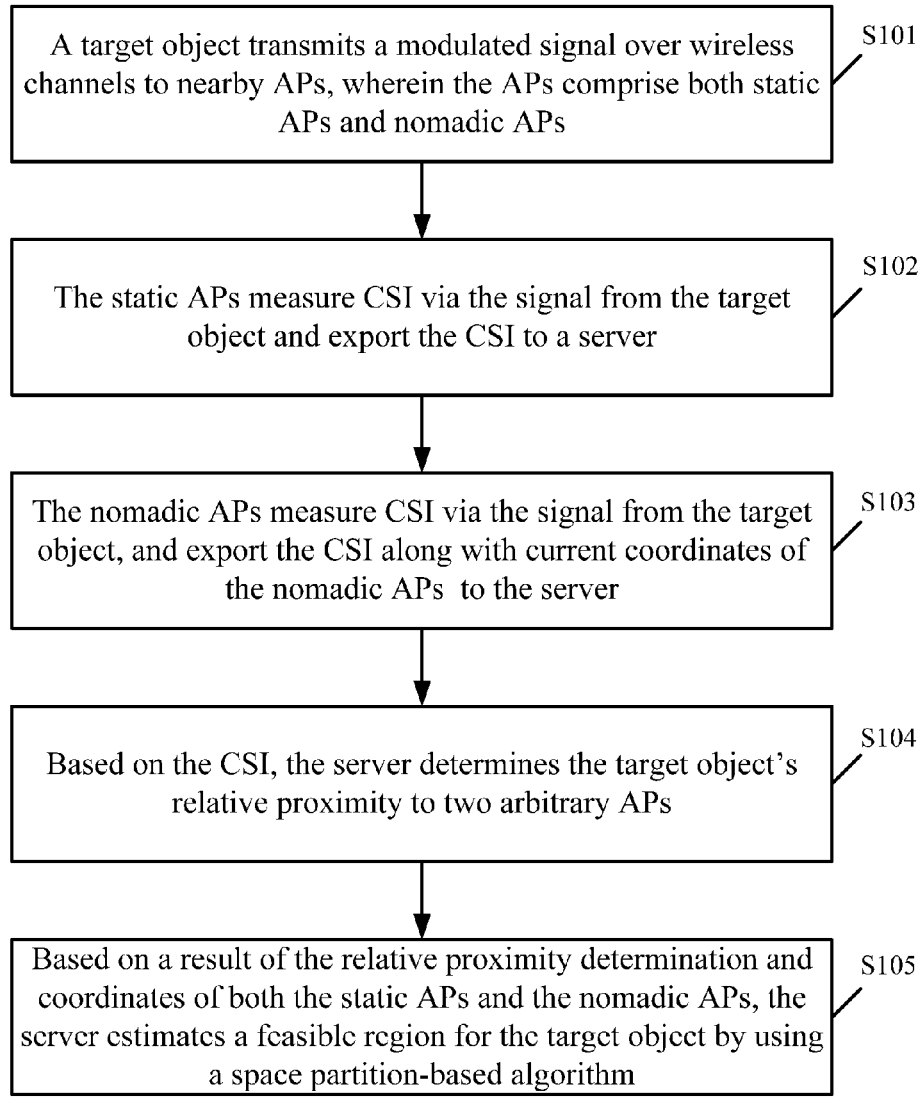
FIG. 1 is a flowchart of a method for indoor localization using nomadic access points according to a first embodiment of the present invention.

FIG. 1 is a flowchart of a method for indoor localization using nomadic access points according to a first embodiment of the present invention. As shown in FIG. 1, the first embodiment of the present invention comprises the following steps:

S101, a target object transmits a modulated signal over wireless channels to nearby APs, wherein the APs comprise both static APs and nomadic APs.

To be more specific, the step S101 further comprises:

the target object modulates a plurality of subcarriers with an OFDM modulator, and transmits the plurality of subcarriers over wireless channels to the nearby APs, wherein the APs comprise both static APs and nomadic APs.

In this step, the target object may send a request for location information, or send other data. The OFDM modulator is able to modulate the request/other data onto a plurality of subcarriers so as to realize OFDM. In details, the transmitter divides the channel into several orthogonal frequencies, also known as several subcarriers, in this way, high speed data streams can be transformed to multiple parallel low speed data streams, and each low speed data stream is modulated onto a subcarrier. The target object is a WiFi-enabled device, of course, it can also be other wireless communication devices. The static APs are fixed to certain locations while the nomadic APs are mobile. The APs may be WiFi-enabled devices, or any other devices that are equipped with built-in sensors, blue teeth or FRID modules, etc.

S102, the static APs measure CSI via the signal from the target object and export the CSI to a server.

To be more specific, the step S102 further comprises: the static APs measure CSI via the plurality of subcarriers and export the CSI to the server.

In details, CSI refers to channel properties of a communication link. It describes how a signal propagates from the transmitter to the receiver with a matrix H. Each element in the matrix H is a decay factor corresponding to a path. The factor may represent, for example, scattering, fading (multipath fading or shadowing fading), and power decay with distance etc. CSI can describe the channel status from subcarrier level. From CSI, the signal strength of each frequency can be obtained. Since CSI won't be disturbed by the multipath or NLOS effect in indoor environment, the embodiments of the present invention determine the proximity based on CSI, so as to attain higher localization accuracy.

S103, the nomadic APs measure CSI via the signal from the target object, and export the CSI along with current coordinates of the nomadic APs to the server.

To be more specific, the step S103 further comprises: the nomadic APs measure CSI via the plurality of subcarriers, and export the CSI along with their coordinates of the current sites to the server.

S104, based on the CSI, the server determines the target object's relative proximity to two arbitrary APs.

To be more specific, the step S104 further comprises: the server transforms the frequency domain CSI into time domain channel impulse response (CIR) with Inverse Fast Fourier Transformation. Then, the server determines PDP based on the CIR and determines the target object's relative proximity to two arbitrary APs based on the CSI. The maximum power of the power delay profile can be used to approximate PDP of each link. Obviously, a larger true value of PDP indicates a shorter distance between the AP and the object whereas a smaller one relates to a longer travel distance.

S105, based on a result of the relative proximity determination and coordinates of both the static APs and the nomadic APs, the server estimates a feasible region for the target object by using a space partition-based algorithm.

To be more specific, the step S105 further comprises: based on the relative proximity determination, the server establishes a set of inequalities:

$$\{(x-x_i)^2+(y-y_i)^2 \le (x-x_j)^2+(y-y_j)^2 | 0<i<n, 0<j<n, i \ne j\},$$

wherein (x, y) denotes the coordinate of the target object, $(x_i, y_i)$ denotes the coordinate of AP i, $(x_j, y_j)$ denotes the coordinate of AP j, and n denotes the quantity of APs; and the server solves the above optimization problem and comes out with the feasible region.

In the above inequalities, $(x-x_i)^2+(y-y_i)^2$ represents the Euclidean metric distance between the target object and AP i, and $(x-x_j)^2+(y-y_j)^2$ represents the Euclidean metric distance between the target object and AP j. As to the nomadic APs, they report CSI along with their coordinates of the current sites to the server. Whereas, the static APs' locations are fixed, so their coordinates are already stored in the server. But it can be understood that, the static APs can work the same way as the nomadic APs do, that is, report CSI along with their coordinates of the current sites to the server.

To solve the above optimization problem, it may come out with a feasible region instead of a single solution. But if there are enough inequalities, the feasible region can be narrowed down to a very small region, which can be regarded as the estimated location of the target object.

This embodiment of the present invention provides basis for proximity determination through obtaining the CSI of each subcarriers from APs, thereby obtains the PDP to calculate the relative proximity between each AP and the object, so that eliminates the multiple and NLOS effects, then establishes the set of inequalities and solves the inequalities, so as to realize a low-cost, accurate, calibration-free indoor localization.

Figure 2:
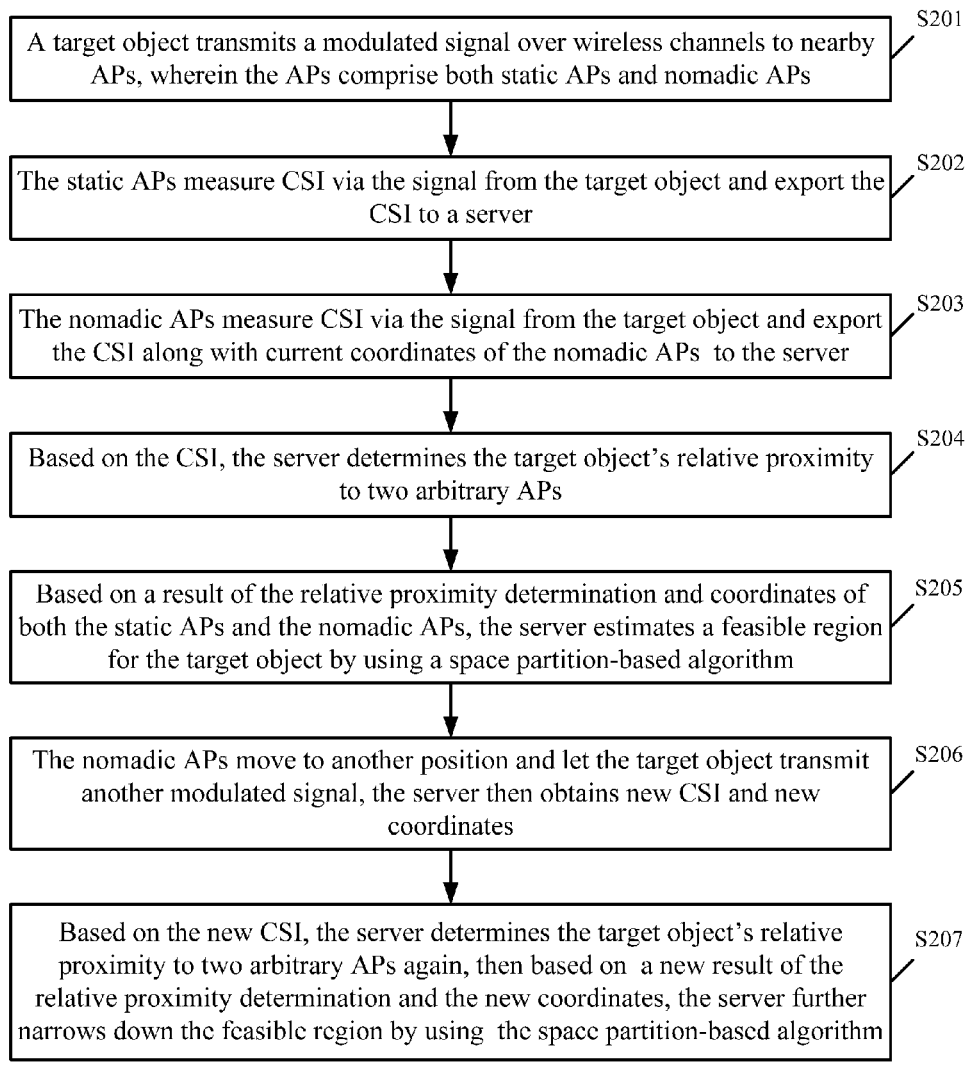
FIG. 2 is a flowchart of a method for indoor localization using nomadic access points according to a second embodiment of the present invention.

FIG. 2 is a flowchart of a method for indoor localization using nomadic access points according to a second embodiment of the present invention. As shown in FIG. 2, the second embodiment of the present invention comprises the following steps:

S201, a target object transmits a modulated signal over wireless channels to nearby APs, wherein the APs comprise both static APs and nomadic APs.

To be more specific, the step S201 further comprises:

the target object modulates a plurality of subcarriers with an OFDM modulator, and transmits the plurality of subcarriers over the wireless channels to the nearby APs, wherein the APs comprise both static APs and nomadic APs.

In this step, the OFDM modulator is able to modulate a plurality of subcarriers so as to realize OFDM. In details, the transmitter divides the channel into several orthogonal frequencies, also known as several subcarriers, in this way, high speed data streams can be converted to multiple parallel low speed data streams, and each low speed data stream is modulated onto a subcarrier. The target object is a WiFi-enabled device, of course, it can also be other wireless communication devices. The static APs are fixed to certain locations while the nomadic APs are mobile. The APs may be WiFi-enabled devices, or any other devices that are equipped with built-in sensors, blue teeth or FRID modules, etc.

S202, the static APs measure CSI via the signal from the target object, and export the CSI to a server.

To be more specific, the step S202 further comprises: the static APs measure CSI via the plurality of subcarriers, and export the CSI to the server.

In details, CSI refers to known channel properties of a communication link. It describes how a signal propagates from the transmitter to the receiver with a matrix H. Each element in the matrix H is a decay factor corresponding to a path. The factor may represent, for example, scattering, fading (multipath fading or shadowing fading), and power decay with distance etc. CSI can describe the channel status from subcarrier level. From CSI, the signal strength of each frequency can be obtained. Since CSI won't be disturbed by the multipath or NLOS effect in indoor environment, the embodiments of the present invention determine the proximity based on CSI, so as to attain higher localization accuracy.

S203, the nomadic APs measure CSI via the signal from the target object, and export the CSI along with current coordinates of the nomadic APs to the server.

To be more specific, the step S203 further comprises: the nomadic APs measure CSI via the plurality of subcarriers, and export the CSI along with their coordinates of the current sites to the server.

S204, based on the CSI, the server determines the target object's relative proximity to two arbitrary APs.

To be more specific, the step S204 further comprises: the server transforms the frequency domain CSI into the time domain CIR with Inverse Fast Fourier Transformation. Then the server determines the PDP based on the CIR and determines the target object's relative proximity to two arbitrary APs based on the CSI. The maximum power of the power delay profile can be used to approximate PDP of each link. Obviously, a larger true value of PDP indicates a shorter distance between the AP and the object whereas a smaller one relates to a longer travel distance.

S205, based on a result of the relative proximity determination and coordinates of both the static APs and the nomadic APs, the server estimates a feasible region for the target object by using a space partition-based algorithm.

To be more specific, the step S205 further comprises: based on the relative proximity determination, the server establishes a set of inequalities:

$$\{(x-x_i)^2+(y-y_i)^2 \le (x-x_j)^2+(y-y_j)^2 | 0<i<n,\ 0<j<n,\ i \ne j\},$$

wherein (x, y) denotes the coordinate of the target object, $(x_i, y_i)$ denotes the coordinate of AP i, $(x_j, y_j)$ denotes the coordinate of AP j, and n denotes the quantity of APs; and the server solves the above optimization problem and comes out with the feasible region.

In the above inequalities, $(x-x_i)^2+(y-y_i)^2$ represents the Euclidean metric distance between the target object and AP i, and $(x-x_j)^2+(y-y_j)^2$ represents the Euclidean metric distance between the target object and AP j. As to the nomadic APs, they report CSI along with their coordinates of the current sites to the server. Whereas, the static APs' locations are fixed, so their coordinates are already stored in the server. But it can be understood that, the static APs can work in the same way as the nomadic APs do, that is, report CSI along with their coordinates of the current sites to the server.

To solve the above optimization problem, it may come out with a feasible region instead of a single solution. If there are enough inequalities, the feasible region can be narrowed down to a very small region, which can be regarded as the estimated location of the target object. However, if the inequalities are not enough, or the feasible region is not small enough, the method provided by this embodiment further performs the following steps:

S206, the nomadic APs move to another position and let the target object transmit another modulated signal, the server then obtains new CSI and new coordinates.

S207, based on the new CSI, the server determines the target object's relative proximity to two arbitrary APs again, then based on a new result of the relative proximity determination and the new coordinates, the server further narrows down the feasible region by using the space partition-based algorithm.

To be more specific, the step S207 is performed the same way as the step S204 and the step 205 do, in this way, more inequalities can be established. With the new inequalities, the feasible region can be further narrowed down. If the feasible region is small enough, it can be regarded as the location of the target object.

This embodiment of the present invention obtains from APs the CSI of each subcarriers, chooses the PDP as the indicator for proximity determination, calculate the relative proximity between each AP and the object, eliminates the multiple and NLOS effects, establishes the set of inequalities based on the result of proximity determination, solves the inequalities and obtains the feasible region, leverages the mobility of the nomadic APs to further narrow down the feasible region, so as to realize the low-cost, accurate, calibration-free indoor localization.

Figure 3:
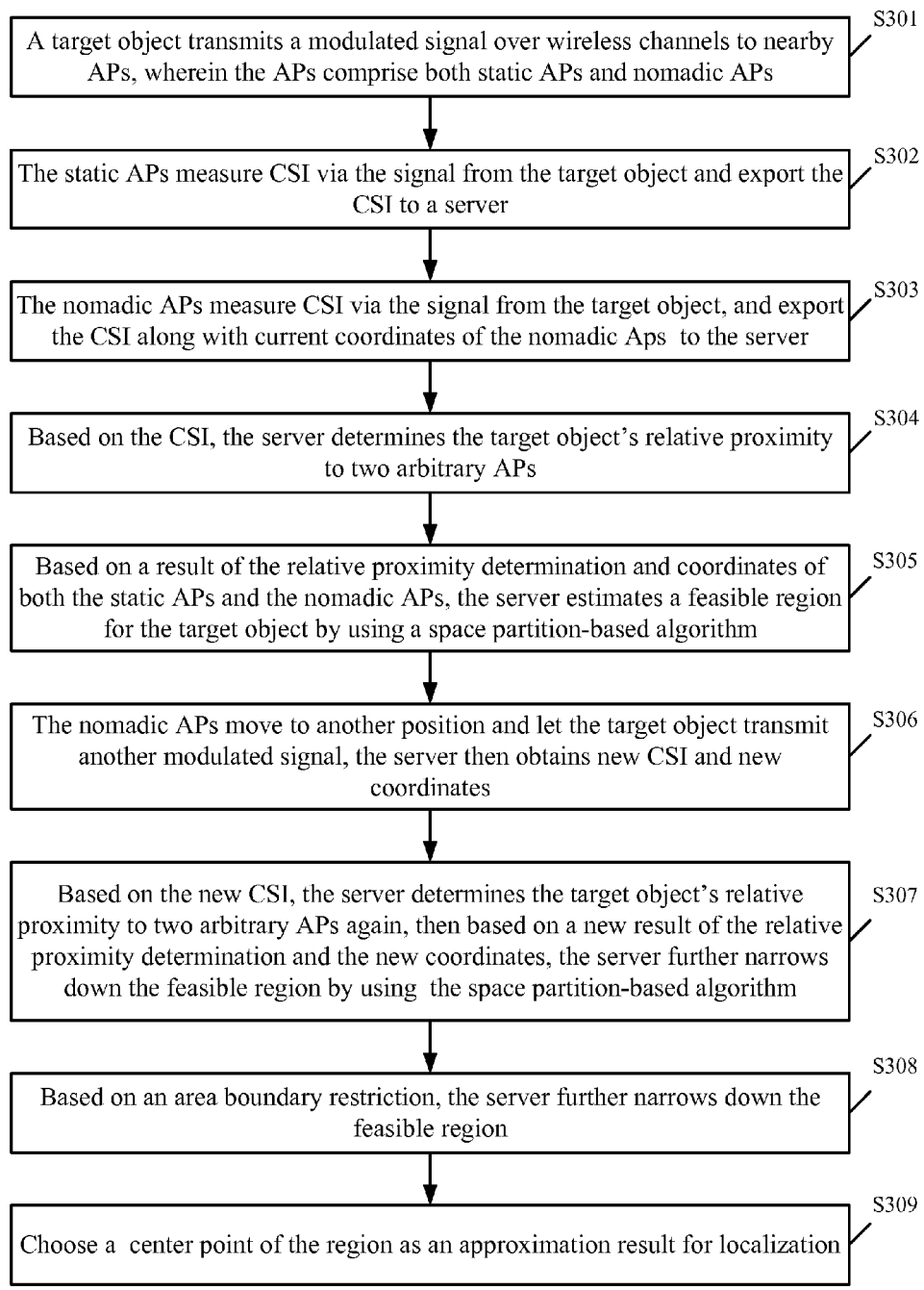
FIG. 3 is a flowchart of a method for indoor localization using nomadic access points according to a third embodiment of the present invention.

FIG. 3 is a flowchart of a method for indoor localization using nomadic access points according to a third embodiment of the present invention. As shown in FIG. 3, the third embodiment of the present invention comprises the following steps:

S301, a target object transmits a modulated signal over wireless channels to nearby APs, wherein the APs comprise both static APs and nomadic APs.

To be more specific, the step S301 further comprises:

the target object modulates a plurality of subcarriers with an OFDM modulator, and transmits the plurality of subcarriers over the wireless channels to the nearby APs, wherein the APs comprise both static APs and nomadic APs.

In this step, the OFDM modulator is able to modulate a plurality of subcarriers so as to realize OFDM. In details, the transmitter divides the channel into several orthogonal frequencies, also known as several subcarriers, in this way, high speed data streams can be transformed to multiple parallel low speed data streams, and each low speed data stream is modulated onto a subcarrier. The target object is a WiFi-enabled device, of course, it can also be other wireless communication devices. The static APs are fixed to certain locations while the nomadic APs are mobile. The APs may be WiFi-enabled devices, or any other devices that are equipped with built-in sensors, blue teeth or FRID modules, etc.

S302, the static APs measure CSI via the signal from the target object, and export the CSI to a server.

To be more specific, the step S302 further comprises: the static APs measure CSI via the plurality of subcarriers, and export the CSI to the server.

In details, CSI refers to known channel properties of a communication link. It describes how a signal propagates from the transmitter to the receiver with a matrix H. Each element in the matrix H is a decay factor corresponding to a path. The factor may represent, for example, scattering, fading (multipath fading or shadowing fading), and power decay with distance etc. CSI can describe the channel status from subcarrier level. From CSI, the signal strength of each frequency can be obtained. Since CSI won't be disturbed by the multipath or NLOS effect in indoor environment, the embodiments of the present invention determine the proximity based on CSI, so as to attain higher localization accuracy.

S303, the nomadic APs measure CSI via the signal from the target object, and export the CSI along with current coordinates of the nomadic APs to the server.

To be more specific, the step S303 further comprises: the nomadic APs measure CSI via the plurality of subcarriers, and export the CSI along with their coordinates of the current sites to the server.

S304, based on the CSI, the server determines the target object's relative proximity to two arbitrary APs.

To be more specific, the step S304 further comprises: the server transforms the frequency domain CSI into the time domain CIR with Inverse Fast Fourier Transformation, and then the server determines the PDP based on the CIR and determines the target object's relative proximity to two arbitrary APs based on the CSI. The maximum power of the power delay profile can be used to approximate PDP of each link. Obviously, a larger true value of PDP indicates a shorter distance between the AP and the object whereas a smaller one relates to a longer travel distance.

S305, based on a result of the relative proximity determination and coordinates of both the static APs and the nomadic APs, the server estimates a feasible region for the target object by using a space partition-based algorithm.

To be more specific, the step S305 further comprises: based on the relative proximity determination, the server establishes a set of inequalities:

$$\{(x-x_i)^2+(y-y_i)^2 \le (x-x_j)^2+(y-y_j)^2 | 0<i<n, 0<j<n, i \ne j\},$$

wherein (x, y) denotes the coordinate of the target object, $(x_i, y_i)$ denotes the coordinate of AP i, $(x_j, y_j)$ denotes the coordinate of AP j, and n denotes the quantity of APs; and the server solves the above optimization problem and comes out with the feasible region.

In the above inequalities, $(x-x_i)^2+(y-y_i)^2$ represents the Euclidean metric distance between the target object and AP i, and $(x-x_j)^2+(y-y_j)^2$ represents the Euclidean metric distance between the target object and AP j. As to the nomadic APs, they report CSI along with their coordinates of the current sites to the server. Whereas, the static APs' locations are fixed, so their coordinates are already stored in the server. But it can be understood that, the static APs can work in the same way as the nomadic APs do, that is, report CSI along with their coordinates of the current sites to the server.

To solve the above optimization problem, it may come out with a feasible region instead of a single solution. If there are enough inequalities, the feasible region can be narrowed down to a very small region, which can be regarded as the estimated location of the target object. However, if the inequalities are not enough, or the feasible region is not small enough, the method provided by this embodiment further performs the following steps:

S306, the nomadic APs move to another position and let the target object transmit another modulated signal, the server then obtains new CSI and new coordinates.

S307, based on the new CSI, the server determines the target object's relative proximity to two arbitrary APs again, then based on a new result of the relative proximity determination and the new coordinates, the server further narrows down the feasible region by using the space partition-based algorithm.

To be more specific, the step S307 is performed the same way as the step S304 and the step 305 do, in this way, more inequalities can be established. With the new inequalities, the feasible region can be further narrowed down. If the feasible region is small enough, it can be regarded as the location of the target object. However, if the feasible region is still not small enough, the method provided by this embodiment further performs the following steps:

S308, based on an area boundary restriction, the server further narrows down the feasible region.

Since the intrinsic boundary of indoor environments imposes restriction on the range of activity for the object, referred as area boundary, more inequalities can be established to narrow down the feasible region.

S309, choose a center point of the region as an approximation result for localization.

This embodiment of the present invention obtains from APs the CSI of each subcarriers, chooses the PDP as the indicator for proximity determination, calculate the relative proximity between each AP and the object, eliminates the multiple and NLOS effects. Then establishes the set of inequalities based on the result of proximity determination, solves the inequalities and obtains the feasible region, leverages the mobility of the nomadic APs to narrow down the feasible region, leverages the area boundary restrictions to further narrow down the feasible region, so as to further improve the localization accuracy, reduce localization inconsistency and realize a low-cost, accurate, calibration-free indoor localization.

It should be noted that, the terms "comprise", "include" or any variations thereof as used herein are intended to cover a non-exclusive inclusion, so that a process, method, article, or apparatus that comprises a list of elements does not include only those elements but may include other elements not expressly listed or inherent to such process, method, article, or apparatus. An element defined by "comprises a . . . ", without more constraints, does not preclude the existence of additional identical elements in the process, method, article, or apparatus that comprises the element.

Sequence number in above embodiments of the present invention is only used for descriptions, which doesn't demonstrate good or better embodiment.

As can be seen from the foregoing descriptions of the embodiments, those skilled in the art can understand clearly that the invention can be implemented in a manner of software plus an essential general-purpose hardware platform. Based upon such understanding, the technical solutions of the invention or a part thereof contributing to the prior art can essentially be embodied in the form of a software product, which can be stored in a storage medium, e.g., an ROM/RAM, a magnetic disk, an optical disk, etc., and which includes several instructions to cause a computer device (which may be a personal computer, a server, a network device, etc.) to perform the methods according to the respective embodiments of the invention or some parts of the embodiments.

The foregoing description is merely about specific embodiments of the present invention, but is not intended to limit the protection scope of the present invention. Any variation or replacement readily figured out by persons skilled in the art within the technical scope of the present invention shall fall within the protection scope of the present invention. Therefore, the protection scope of the present invention shall be subject to the protection scope of the claims.

All the above are the preferred embodiments of the present invention. It is to be understood that, for one skilled in the art, the invention is intended to cover various modifications and equivalent arrangements included within the principle of the invention.

What is claimed is:

1. A method for indoor localization using nomadic access points, comprising the following steps:

a target object transmitting a modulated signal over wireless channels to nearby access points, wherein the access points comprise both static access points and nomadic access points;

the access points measuring channel state information via the modulated signal from the target object, after that, the static access points exporting the channel state information to a server, the nomadic access points reporting the channel state information along with current coordinates of the nomadic access points to the server; and based on the channel state information, the server determining the target object's relative proximity to two arbitrary access points, then based on a result of the relative proximity determination and coordinates of both the static access points and the nomadic access points, the server estimating a feasible region for the target object by using a space partition-based algorithm.

2. The method as claimed in claim 1, wherein after the step of the server estimating the feasible region for the target object by using the space partition-based algorithm, the method comprises the following steps:

the nomadic access points moving to another position and letting the target object transmit another modulated signal, the server then obtaining new channel state information and new coordinates;

based on the new channel state information, the server determining the target object's relative proximity to two arbitrary access points again, then based on a new result of the relative proximity determination and the new coordinates, the server further narrowing down the feasible region by using the space partition-based algorithm.

3. The method as claimed in claim 2, wherein after the step of the server further narrowing down the feasible region by using the space partition-based algorithm based on the new result of the relative proximity determination and the new coordinates, the method comprises the following step:

based on an indoor area boundary restriction, the server further narrowing down the feasible region.

4. The method as claimed in claim 3, wherein after the step of the server further narrowing down the feasible region based on the area boundary restriction, the method comprises the following step:

choosing a center point of the feasible region as an approximation result for localization.

5. The method as claimed in claim 1, wherein the step of the target object transmitting the modulated signal over the wireless channels to the nearby access points comprises the following steps:

the target object modulating information onto a plurality of subcarriers with an OFDM modulator, and the target object transmitting the plurality of subcarriers over the wireless channels to the nearby access points.

6. The method as claimed in claim 5, wherein the step of the access points measuring the channel state information via the modulated signal from the target object comprises the following step:

the access points measuring channel state information via the plurality of subcarriers from the target object.

7. The method as claimed in claim 5, wherein the step of the server determining the target object's relative proximity to two arbitrary access points based on the channel state information, comprises the following steps:

the server transforming the frequency domain channel state information into time domain channel impulse response with Inverse Fast Fourier Transformation, and determining the power of direct path based on the channel impulse response, wherein a larger true value of power of direct path indicates a shorter distance between the access point and the object whereas a smaller one relates to a longer travel distance.

8. The method as claimed in claim 2, wherein the step that the server further narrowing down the feasible region by using the space partition-based algorithm comprises the following steps:

based on the relative proximity determination, the server establishing a set of inequalities: $\{(x-x_i)^2+(y-y_i)^2 \le (x-x_j)^2+(y-y_j)^2 | 0<i<n,\ 0<j<n,\ i \ne j\}$, wherein $(x, y)$ denotes the coordinate of the target object, $(x_i, y_i)$ denotes the coordinate of access point i, $(x_j, y_j)$ denotes the coordinate of access point j, and n denotes the quantity of the access points; and the server solving the inequalities and coming out with the feasible region.

* * * * *